United States Patent
Ramos et al.

(10) Patent No.: US 9,058,644 B2
(45) Date of Patent: Jun. 16, 2015

(54) LOCAL IMAGE ENHANCEMENT FOR TEXT RECOGNITION

(71) Applicant: Amazon Technologies, Inc., Reno, NV (US)

(72) Inventors: David Paul Ramos, Cambridge, MA (US); Chang Yuan, Seattle, WA (US); Keith Harrison Goodman, Allston, WA (US); Avnish Sikka, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 121 days.

(21) Appl. No.: 13/800,951

(22) Filed: Mar. 13, 2013

(65) Prior Publication Data

US 2014/0270528 A1  Sep. 18, 2014

(51) Int. Cl.
*G06K 9/18* (2006.01)
*G06T 5/00* (2006.01)
*G06T 7/00* (2006.01)

(52) U.S. Cl.
CPC ............... *G06T 5/001* (2013.01); *G06T 7/0042* (2013.01); *G06T 2207/10004* (2013.01); *G06T 2207/30168* (2013.01); *G06T 2207/30201* (2013.01)

(58) Field of Classification Search
USPC ......... 382/165, 170, 181, 182, 183, 310, 321; 348/E13.047
See application file for complete search history.

(56) References Cited

U.S. PATENT DOCUMENTS

| | | | | |
|---|---|---|---|---|
| 5,321,770 | A * | 6/1994 | Huttenlocher et al. | 382/174 |
| 2004/0156561 | A1* | 8/2004 | Yu-Chuan et al. | 382/298 |
| 2007/0162922 | A1* | 7/2007 | Park | 725/10 |
| 2007/0242153 | A1* | 10/2007 | Tang et al. | 348/365 |
| 2008/0317378 | A1 | 12/2008 | Steinberg et al. | |
| 2010/0303356 | A1* | 12/2010 | Fosseide et al. | 382/182 |
| 2011/0081083 | A1* | 4/2011 | Lee et al. | 382/182 |
| 2013/0004076 | A1* | 1/2013 | Koo et al. | 382/176 |
| 2013/0329023 | A1* | 12/2013 | Suplee et al. | 348/61 |

OTHER PUBLICATIONS

Doermann et al. "Progress in Camera-Based Document Image Analysis", Proceedings of the Seventh International Conference on Document Analysis and Recognition, IEEE 2003.*

"International Search Report and Written Opinion" dated Jun. 27, 2014 in corresponding patent application No. PCT/US2014/21453.

* cited by examiner

*Primary Examiner* — Gregory F Cunningham
(74) *Attorney, Agent, or Firm* — Novak Druce Connolly Bove + Quigg LLP

(57) ABSTRACT

Various embodiments enable regions of text to be identified in an image captured by a camera of a computing device for preprocessing before being analyzed by a visual recognition engine. For example, each of the identified regions can be analyzed or tested to determine whether a respective region contains a quality associated with poor text recognition results, such as poor contrast, blur, noise, and the like, which can be measured by one or more algorithms. Upon identifying a region with such a quality, an image quality enhancement can be automatically applied to the respective region without user instruction or intervention. Accordingly, once each region has been cleared of the quality associated with poor recognition, the regions of text can be processed with a visual recognition algorithm or engine.

25 Claims, 9 Drawing Sheets

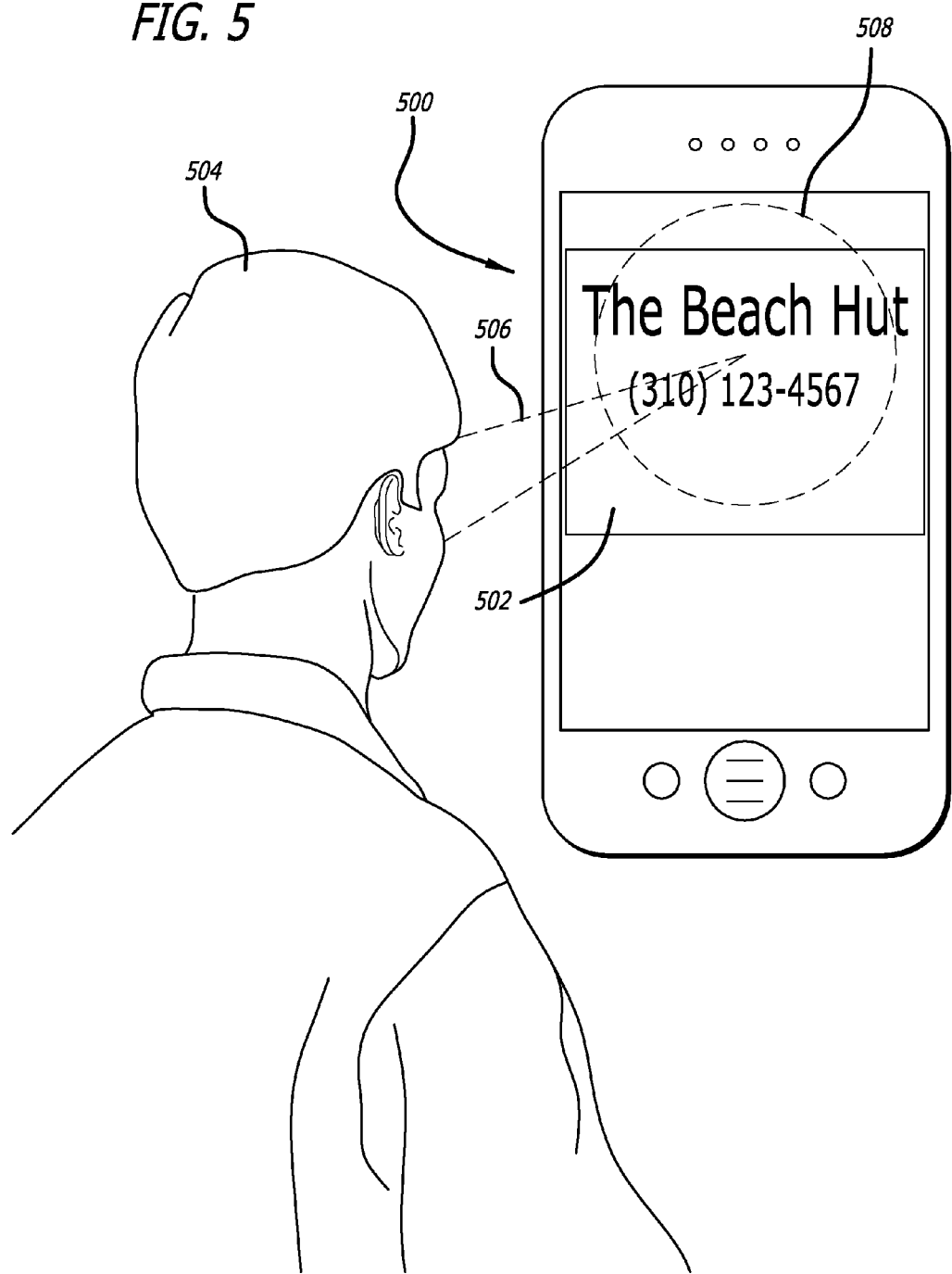

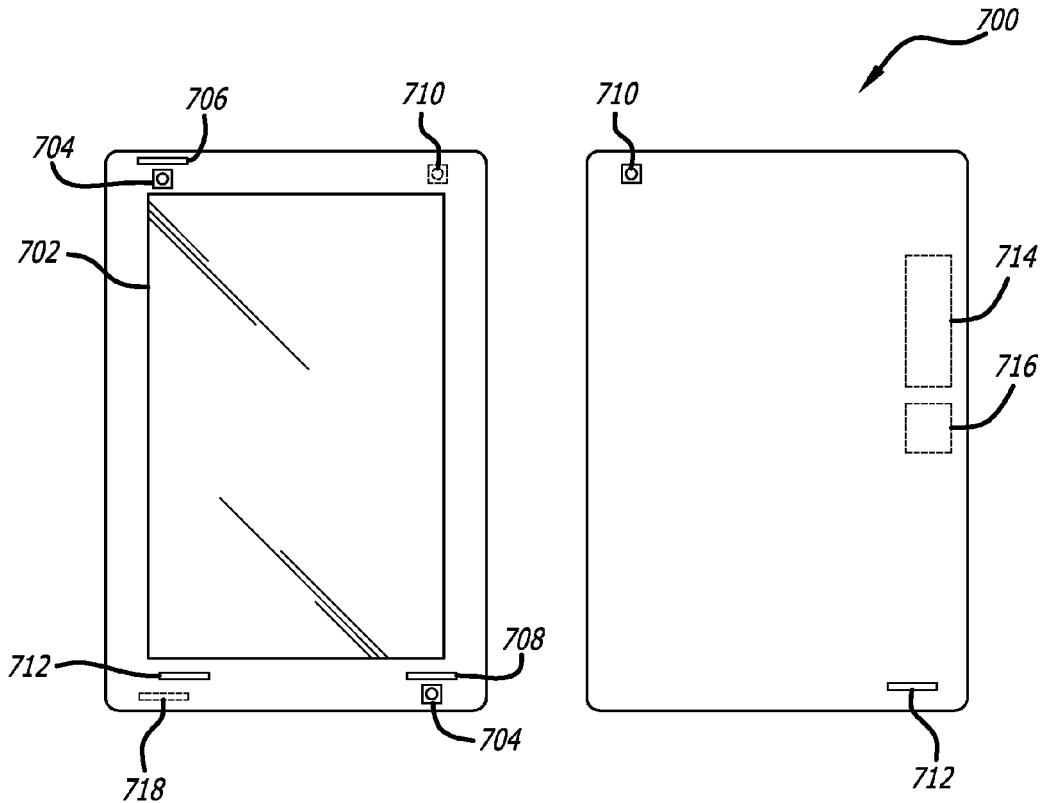
FIG. 7A  FIG. 7B
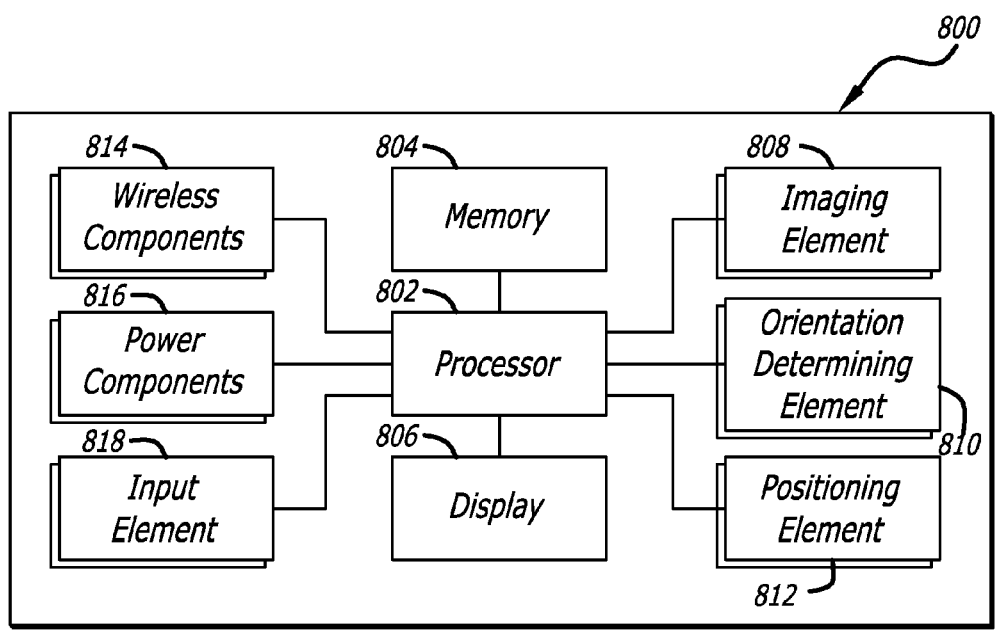
FIG. 8

LOCAL IMAGE ENHANCEMENT FOR TEXT RECOGNITION

BACKGROUND

Optical character recognition (OCR) systems are generally used to detect text present in an image and to convert the detected text into its equivalent electronic representation. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters. This imprecision is further exacerbated when attempting to recognize text from images containing variations in lighting, shadows, contrast, glare, blur, and the like. Further, efficient implementation of these OCR engines is a challenge, despite the rapid growth of mobile computational power due to ever-increasing image resolution, video frame rate, and increasing algorithmic complexity. Therefore, as technology advances and as people are increasingly using portable computing devices in a wider variety of ways, it can be advantageous to adapt the ways in which images are processed in order to improve visual recognition precision and computing efficiency of the same.

BRIEF DESCRIPTION OF THE DRAWINGS

Various embodiments in accordance with the present disclosure will be described with reference to the drawings, in which:

FIG. 5 illustrates an example situation of identifying salient region(s) of an image using gaze in accordance with at least one embodiment;

FIGS. 7A and 7B illustrate an example computing device that can be used to implement aspects of various embodiments;

FIG. 8 illustrates example components that can be used with a device such as that illustrated in FIGS. 7A and 7B;

DETAILED DESCRIPTION

Figure 1:
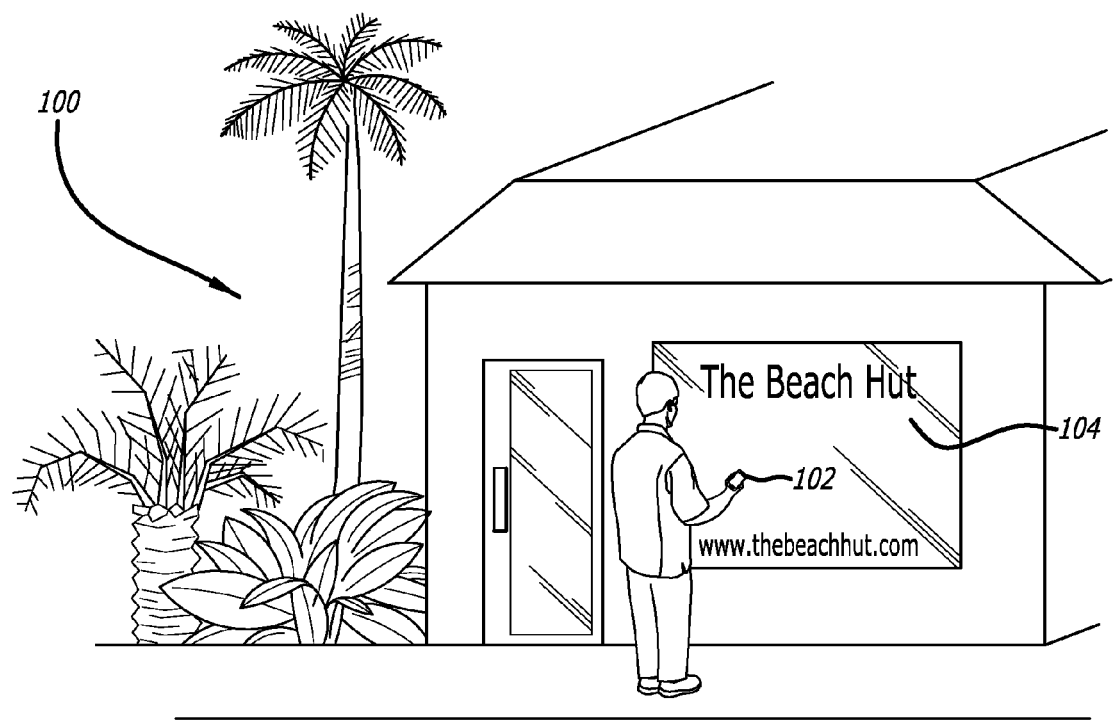
FIG. 1 illustrates an example situation where a user is attempting to recognize text with a computing device in accordance with various embodiments.

Systems and methods in accordance with various embodiments of the present disclosure may overcome one or more of the aforementioned and other deficiencies experienced in conventional approaches to processing images for visual recognition. In particular, various approaches provide an image preprocessing method to accelerate image processing and/or analysis tasks. For example, regions of text can be identified in an image captured by a camera of a computing device. Each of the regions can be analyzed or tested to determine whether a respective region contains a quality associated with poor text recognition, such as poor contrast, blur, noise, and the like, which can be measured by one or more algorithms. Upon identifying a region with such a quality, an image quality enhancement can automatically be applied to the respective region without intervention from a user. As discussed herein, image quality refers to qualities ideal for recognizing text, which are not necessarily synonymous with quality as seen or judged by a human. Accordingly, the regions of text can then be processed with a visual recognition algorithm or engine.

Various embodiments can detect and recognize text in an image using approaches that are robust to variations in lighting, shading, contrast, or other such aspects. For example, a camera might capture an image of a sign that is partially covered in shadow. Due at least in part to the shadowing, the separation between color values of text characters and background regions will differ between the shadowed regions and the non-shadowed regions. Further, there can be variations in the shadowing that can also affect the separation. These and other examples can be remedied using local image enhancements on a region by region basis. As used herein, local image enhancement refers to a set of image processing methods for enhancing local regions of an image based on their respective quality (e.g., contrast, blur, noise) or lack thereof. For example, local image enhancement can include contrast stretching, histogram normalization, image denoising, image sharpening (e.g., unsharp masking), image upscaling, image deconvolution, super-resolution, and others. The local image enhancements tend to be more drastic changes than global image enhancements. For example, in an image where strong differences exist between local image regions, effects of a global enhancement are generally averaged and diluted over the larger area, which can be a detriment to regions of otherwise good quality and not quite enough of an enhancement for regions of poor quality. For example, the contrast stretching of a locally under-exposed region is more effective than adjusting the contrast of the whole image.

Further, user gaze tracking can be used to identify and target regions for local enhancement. Similarly, the user can tap a region on a touch display or hover above the display utilizing finger tracking, in order to select a region of the image containing text. Accordingly, the local image enhancement, in at least one embodiment, can be performed at a device level where the camera exposure, focus, and auto-balance settings can be automatically adjusted. Additionally, user interaction, such as providing a selection to one or more regions can provide a seed point for generating an expanded region utilizing algorithms, such as a graph-cut based foreground-background image segmentation algorithm. Accordingly, the local image enhancements can be applied to this region designated by the user.

Various embodiments detect and recognize text to enable a user to perform various functions or tasks. For example, a user could point a camera at an object with text, in order to capture an image of that object. The camera can be integrated with a portable computing device that is capable of taking the image and processing the image (or providing the image for processing) to recognize, identify, and/or isolate the text in order to send the text to an application or function. The application or function can then utilize the text to perform an action in substantially real-time. For example, a user walking down a street could see an advertisement that includes a phone number. The user can, using the teachings described herein, call the phone number by pointing a camera of a smartphone, for example, at the number to have the number entered into a phone application without manually entering the number. In one instance, the device could enter the number from the image and wait for a user direction to initiate the call or, in another instance, the call could be automatically placed by the device. This example can be extended to entering Web addresses or URLs in a web browser, email addresses for opening a new message window, physical addresses for opening a map application to display directions, and various other actionable data types.

Various other functions and advantages are described and suggested below as may be provided in accordance with the various embodiments.

FIG. 1 illustrates an example situation 100 in which a user is attempting to recognize text (e.g., strings of one or more alphanumeric characters) in an image taken with camera of a computing device 102 on a window 104, in accordance with at least one embodiment. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming controllers, and portable media players, among others. The portable computing device 102 in this example includes a camera and an interface (e.g., a display element) that displays the field of view of the camera. The camera can include a lens and an image sensor that converts an optical image into an electrical signal. The portable computing device 102 can be aimed in different directions and the interface can display an image of the current/active field of view being captured by the camera.

In this example, since the user is walking, obtaining an accurate optical character recognition (OCR) engine output from a random single image can be a challenge. The outside world is filled with less than ideal conditions, such as poor or varied lighting, movement during image capture, and other circumstances, that make capturing an image ideal for processing by a conventional OCR engine difficult. Further, given people's busy schedules, taking the time and care to capture an ideal image in a moving environment, such as in a user's hand, is not necessarily practical and likely not to be expected. It can, thus, be advantageous to integrate information from multiple images (or video) in order to piece together textual details that may be blocked, indistinguishable, or obscured in a single image to generate a more accurate text recognition output. In this example, depending on the location of the sun in FIG. 1, glare reflecting off the window 104, or a shadow from a nearby tree, could block or obscure a portion of text from a certain angle resulting in an incomplete textual output if only a single image from that angle were processed by a conventional OCR engine.

Figure 2A:
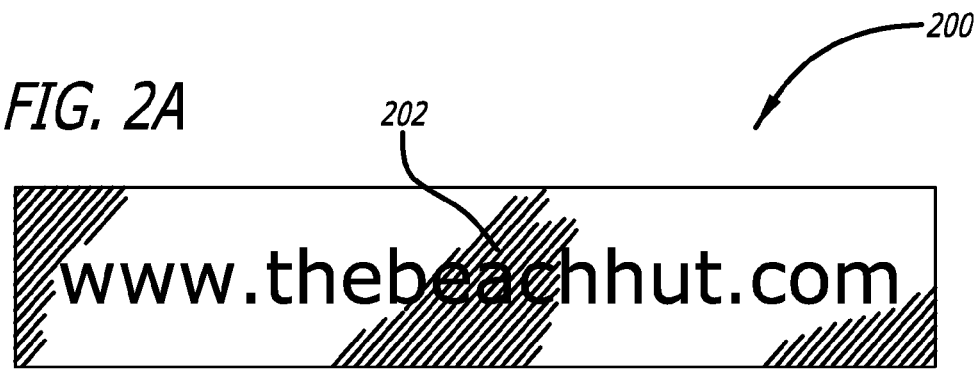
FIGS. 2A-2C illustrate an example visual representation of a process of recognizing text in accordance with at least one embodiment.
Figure 2B:
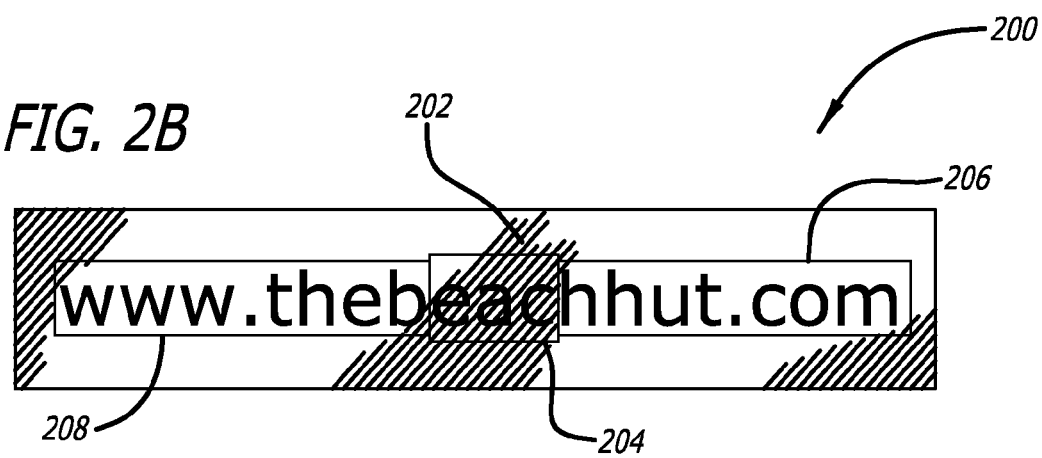
Figure 2C:
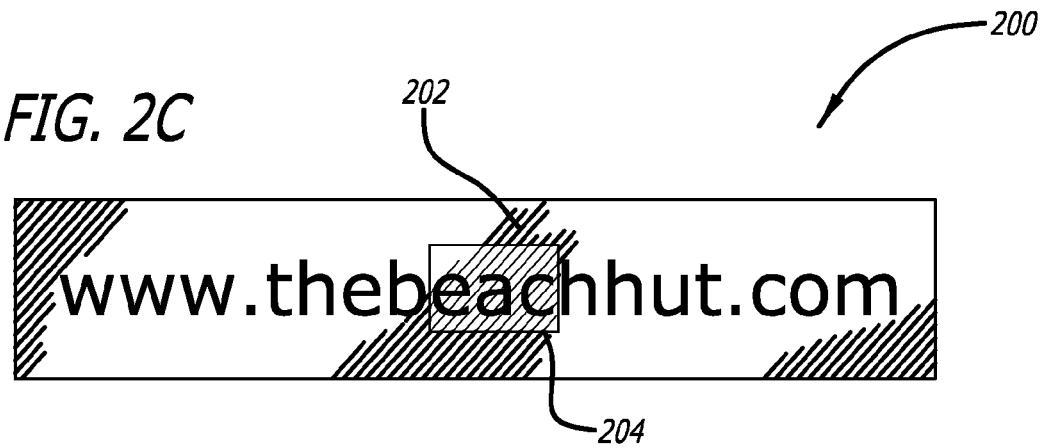

FIGS. 2A-2C illustrate a first example step-by-step representation of a process for locally enhancing regions of an image, in accordance with various embodiments. FIG. 2A illustrates a magnified view 200 of the web address displayed on the window 104 from FIG. 1. In this example, the text is a web address for the Beach Hut restaurant, "www.thebeachhut.com." In this example, a portion of the image is obscured by a shadow 202 making the characters of a portion of the web address less discernible from the background relative to the rest of the image for that portion.

Upon obtaining an image, one or more regions of the image are identified as having properties that indicate the presence of text. FIG. 2B illustrates the magnified view 200 including local region 204 which contains the characters of the web address "www.theb", region 206 which contains the "eac", and 208 which contains the "hhut.com". In this example, the region 204 has been singled out from the regions 206 and 208 due to the change in contract associated therewith. Therefore, upon identifying these regions, the regions are each analyzed to determine whether one of them contains a quality characteristic associated with poor text recognition and, thereby, requires local enhancement in an attempt to substantially correct, compensate, or remedy the respective region to increase the likelihood of accurate character recognition. In this example, the region 204 partially obscured by the shadow 202 has been identified as having a poor contrast quality and, thereby, requiring a local contrast stretching enhancement. Local contrast enhancement (often called normalization), in this example, attempts to improve the contrast in the local region 204 by 'stretching' the range of intensity values it contains to span a desired range of values (e.g., the full range of pixel values that the image type concerned allows). Accordingly, the local contrast stretching enhancement can be automatically applied when the region 204 is identified as having a quality value, factor, or other metric below a threshold.

Accordingly, FIG. 2C illustrates the magnified view 200 of the web address after the local contrast stretching enhancement has been applied to the region 204. In this example, the pixel values of the region 204 have been stretched in order to make the characters "eac" standout from the background. By contrast, in this example, if a global contrast stretch had been applied, the pixel values for the characters in regions 206 and 208 would likely have been stretched to a value close to the background pixel value and, thus, potentially make regions 206 and 208 of poorer quality relative to the original image while likely only minimally improving the recognition quality of region 204.

Figure 3A:
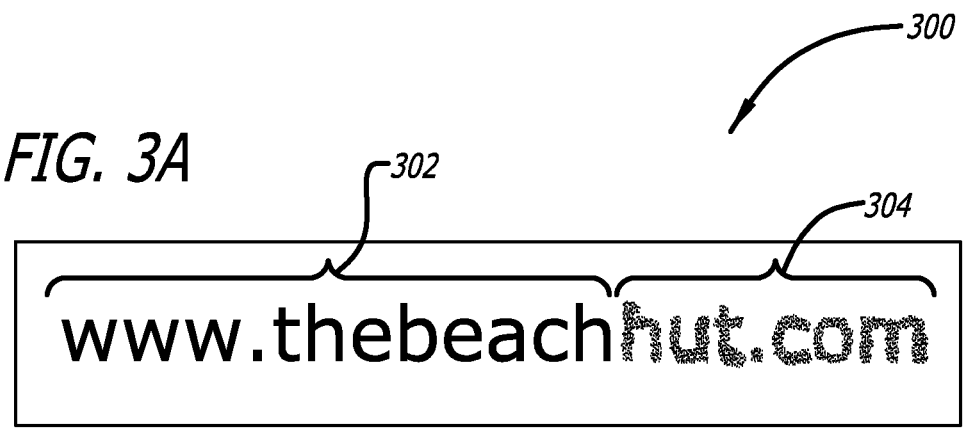
FIGS. 3A-3C illustrate another example visual representation of a process of recognizing text in accordance with at least one embodiment.
Figure 3B:
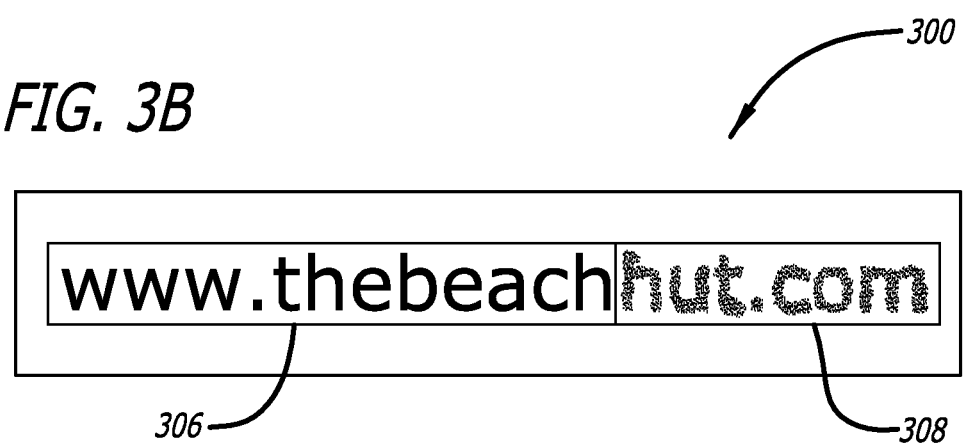
Figure 3C:
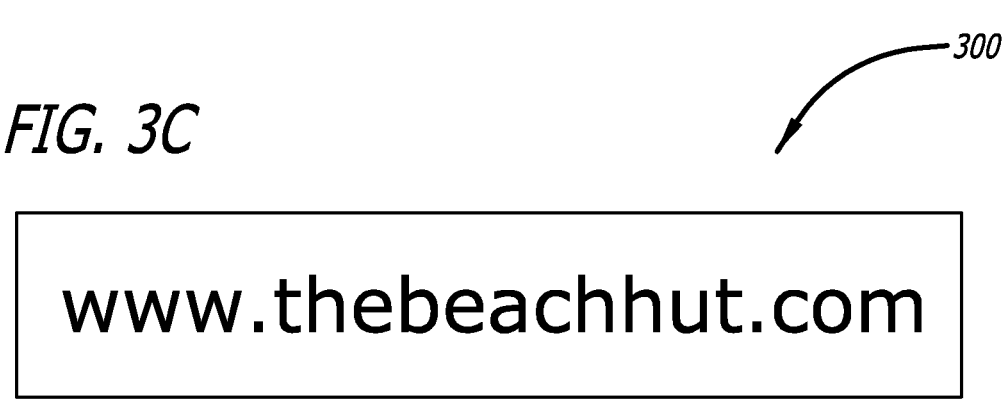

FIGS. 3A-3C illustrate a second example step-by-step representation of a process for locally enhancing regions of an image, in accordance with various embodiments. FIG. 3A illustrates a magnified view 300 of the web address displayed on the window 104 from FIG. 1. In this example, a first portion 302 of the image is of substantially good quality and a second portion 304 is blurry which will likely present at least one challenge for a recognition engine. As described above, upon obtaining an image, the image will be analyzed to identify one or more regions containing text. FIG. 3B illustrates two such regions 306 and 308, which, in this example, respectively represent the "www.thebeach" and "hut.com" portions of the web address. Accordingly, each region is subsequently analyzed to determine whether regions 306 and 308 contain any sort of image imperfection or quality associated with poor text recognition when processed with an OCR engine.

In this example, the region 304 has been identified has having a blur quality below a threshold quality value and, thus, prompting the computing device 102 (or a server in communication therewith) to perform image sharpening to the region 304. FIG. 3C illustrates the web address "www.thebeachhut.com" after a sharpening algorithm as substantially improved or remedied the poor blur quality for processing by an OCR engine. Accordingly, the single region associated with the web address is then provided to the OCR engine to recognize the individual characters therein.

Figure 4:
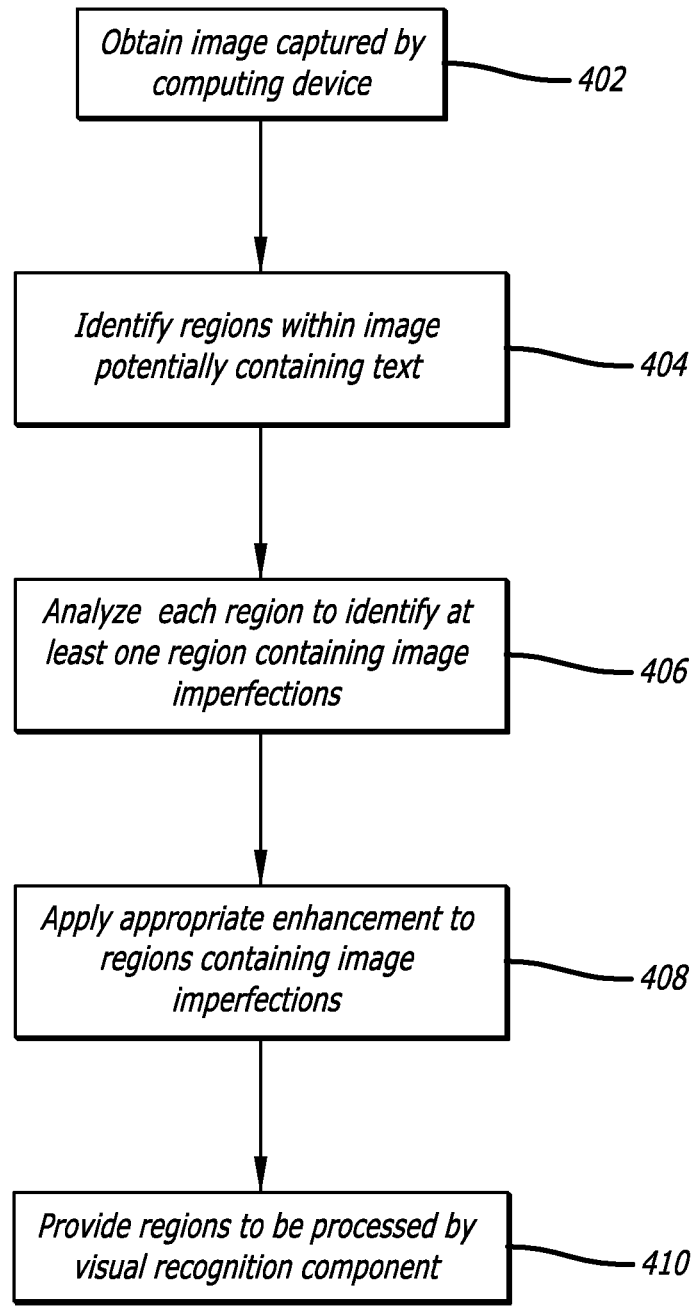
FIG. 4 illustrates an example process of recognizing text in accordance with at least one embodiment.

FIG. 4 provides a flow diagram illustrating a process 400 for locally enhancing regions of an image, in accordance with at least one embodiment. Portions of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

As indicated at block 402, the process 400 generally begins by obtaining an image captured by an imaging sensor of a computing device. Each of the images represents substantially the same text target and may include at least one visual imperfection, such as blurriness, glare, shadows, and the like. In one example, a plurality of maximally stable extremal (MSERs) regions within the image potentially containing at least one character of text are detected or identified 404. In one example, text detection can include performing glyph detection on the captured image. The image can be separated into regions of similar grayscale values that fall within predefined size constraints called glyphs. Character classification can then be performed, where any glyphs that are not characters are removed using machine learning algorithms or other similar algorithms. Pair finding/word finding can then be performed, where the glyphs are grouped into words and lines, and baseline estimation can then be performed on the words and lines to estimate lines for the top and bottom points on the words. Word splitting can then be performed, where the spaces between the glyphs can be examined to decide word boundaries used for evaluation or display purposes. Binarization can then be performed, where the regions are binarized to produce a text mask which can include any punctuation that may have been filtered out earlier due to a minimum size constraint that can be imposed thereon. In this example, each of the one or more MSER regions is analyzed to identify one or more regions containing blur, poor contract, or a noise quality 406. Upon identifying an MSER region containing blur, poor contract, or a noise quality below a threshold quality value, an appropriate local image enhancement can be applied to the MSER region in an attempt to improve text recognition within the MSER region for an optical character recognition (OCR) engine 408. In this example, as indicated at block 410, the identified text is sent to be analyzed each of the plurality of MSER regions to recognize text with an OCR engine.

In accordance with at least one embodiment, glyph detection can further include extracting the maximally stable extremal (MSERs) regions from the image. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than three child regions, should be ignored.

In accordance with an embodiment, pair finding can further include sorting the remaining glyphs (MSERs which appear to be characters) left to right, and all pairs which pass a test can be considered a possible character pair. The test compares the distance between glyphs, vertical overlap of two glyphs, their relative height, width, stroke width, and intensity. Word line finding, in accordance with at least one embodiment, can further include treating each glyph as a vertex in a graph and each pair as an edge, then using an iterative dynamic programming algorithm to extract the best (e.g., the longest) sequence of edges, where the longest edges become word candidates. Additionally or alternatively, word line finding can include selecting glyphs from left to right after three glyphs are found to be in a good sequence.

In accordance with an embodiment, base line estimation may additionally include estimating the slope of the baseline using a clustering algorithm, then computing intercepts that minimize the minimum distance between baselines and glyphs. Each word candidate can have at least two lines in the top and bottom points of the glyphs, and if two or more words appear to have the same baselines, they can be merged and the lines can be reestimated. Further, in accordance with an embodiment, glyph refinement can be performed after baseline estimation is performed, where all glyphs that are classified as non-text, but fit into the baseline configuration, are included. Word splitting can further include estimating the spaces between glyphs in each baseline and choosing a threshold, where any gap between characters greater than that threshold can be considered to be a word boundary (space) and can be marked as such. Further, binarization may include binarizing each region in the bounding box based at least in part on the threshold used to compute the regions character and the regions character's neighbors. Various other preprocessing approaches can be used as well as discussed or suggested elsewhere herein.

Although examples discussed herein may be directed to text recognition, such methods and techniques for local image enhancement can also be extended and applied to other visual recognition systems and applications. For example, the local image enhancements discussed herein could be used to assist in recognizing products, matching a captured image to other images, faces of people, landmarks, businesses, portions of a map, barcodes, quick response (QR) codes, and the like. Accordingly, the local regions can be enhanced for recognizing any visual target with any visual recognition technique, such as an optical character recognition, a facial recognition, a template matching algorithm, a feature point detection and/or comparison algorithm, image processing, video processing, and the like. Various other applications can also utilize the instant teachings as well as discussed or suggested elsewhere herein.

FIG. 5 shows an example situation of a user 504 viewing an image 502 displayed on computing device 500 to illustrate another image preprocessing technique, in accordance with at least one embodiment. In at least some embodiments, user gaze and eye tracking can be utilized to identify and target regions for local enhancement. For example, gaze of a user's eyes lead to a pair of virtual rays that intersect at a point on the display screen of the computing device 500 and the intersection(s) can be treated as a seed point for generating an expanded region utilizing algorithms, such as a graph-cut based foreground-background image segmentation algorithm. Accordingly, an area associated with the location(s) of intersection can be identified as the one or more regions based on the assumption that a user's eyes are immediately drawn to the main features of the image. Therefore, in this example, the user 504 is viewing the image 502 displayed on computing device 500 and the user's gaze 506 intersects a point substantially in the middle of the text region of the image 502. As discussed above, one or more seed points for generating an expanded region may then fade or decay away from these the seed points to encompass a priority local enhancement processing region 508. Similarly, the user can tap a region on a touch display or hover above the display utilizing finger tracking, in order to select a region of the image containing text. Accordingly, the local image enhancement, in at least one embodiment, can be performed at a device level where the camera exposure, focus, and auto-balance settings can be automatically adjusted.

Figure 6A:
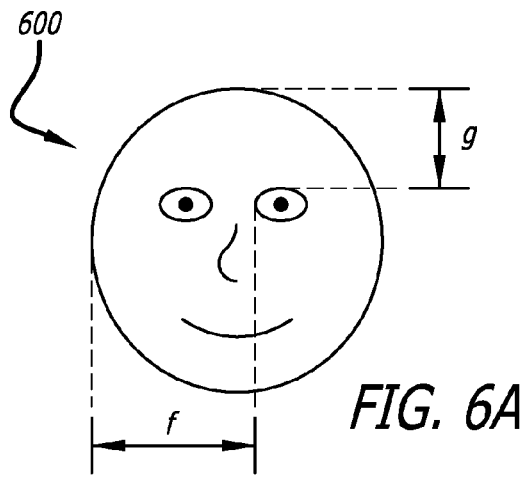
FIGS. 6A-6F illustrate examples of determining gaze direction of a user that can be utilized in accordance with various embodiments.
Figure 6B:
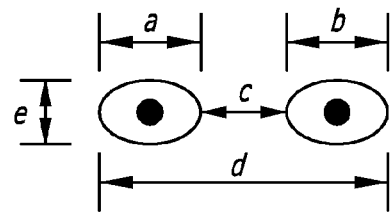
Figure 6C:
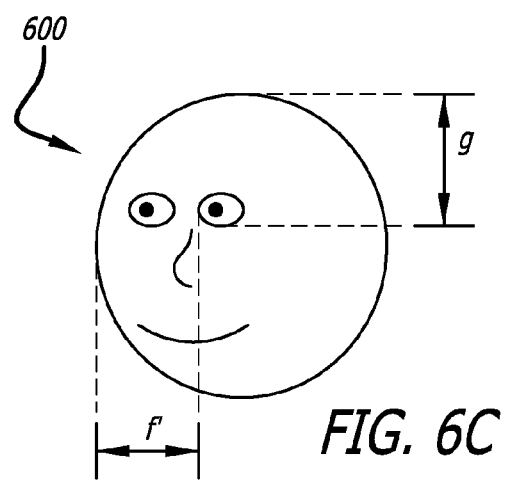
Figure 6D:
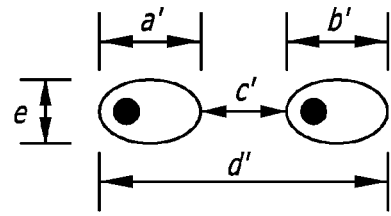
Figure 6E:
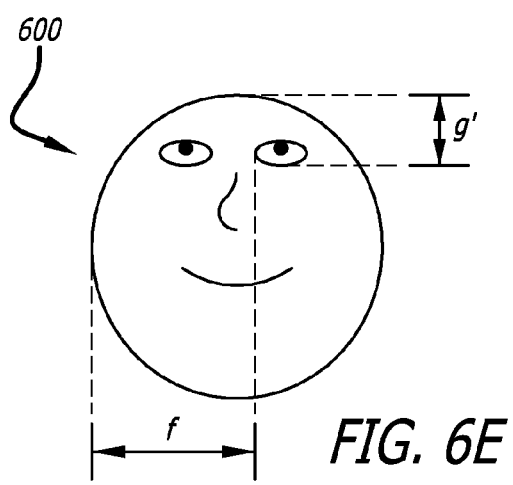
Figure 6F:
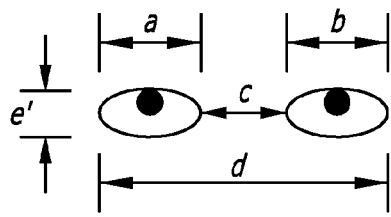

In order to determine the gaze direction of a user for such a process, the computing device 500 in at least some embodiments has to determine the relative position of the user 504 relative to the device, as well as dimensions or other aspects of the user at that position. FIGS. 6A-6B illustrates an example 600 wherein images are captured and analyzed to determine the relative positions of the user's head and the user's eyes. In a system wherein the algorithm is able to differentiate the user's pupils, the system can also utilize the relative position of the pupils with respect to the eye position. For example, FIGS. 6C-6D illustrates a case where the user is looking "left" (or to the user's right"), such that a center point of each user's pupil is to the left (in the image) of the center point of the respective eye. Similarly, FIGS. 6E-6F illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking.

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

FIG. 8 illustrates a set of basic components of an electronic computing device 800 such as the device 800 described with respect to FIG. 8. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
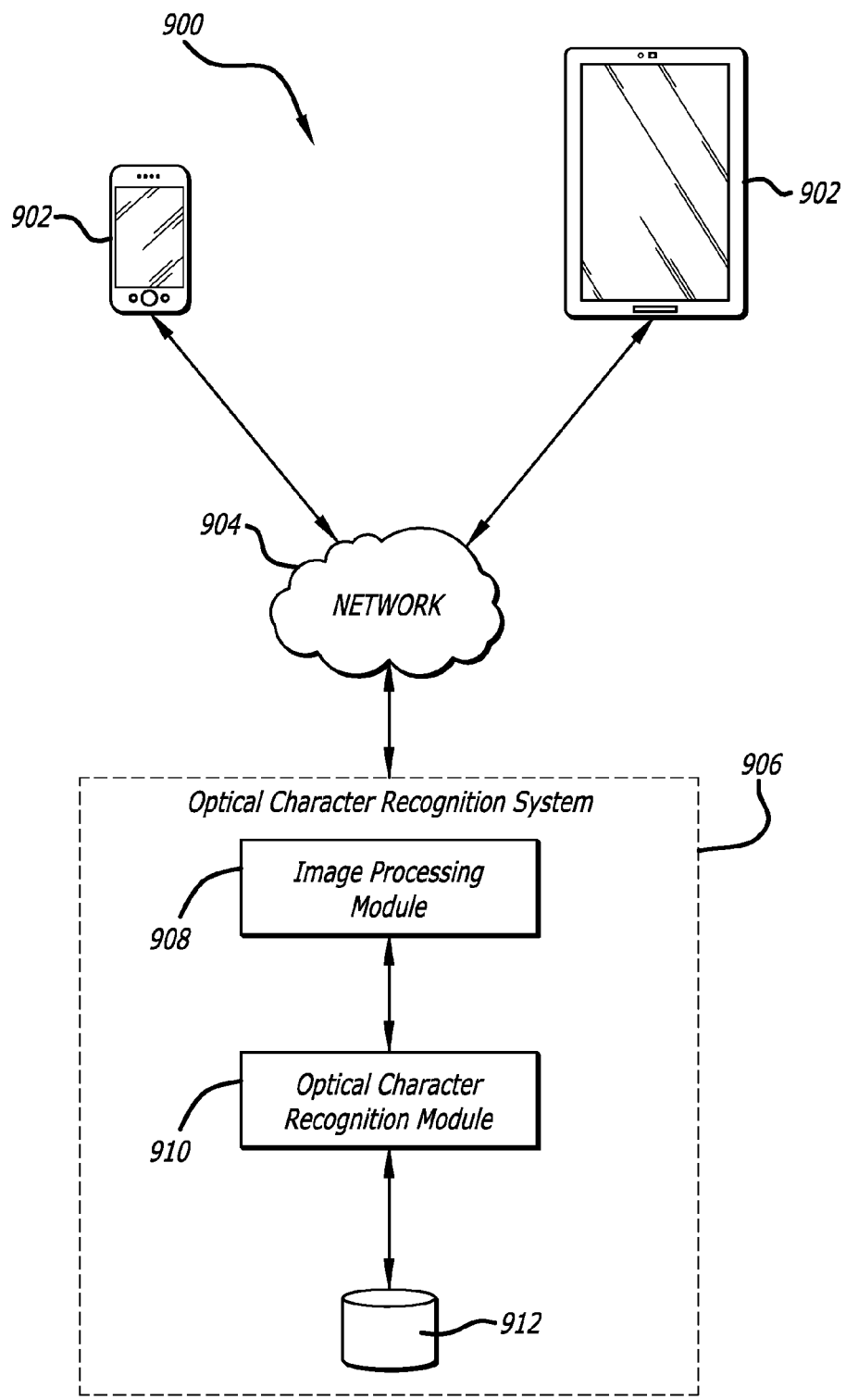
FIG. 9 illustrates an example environment in which various embodiments can be implemented.

FIG. 9 is an example environment 900 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 902, such as a personal computer, tablet computer, smart phone, and the like, to access an Optical Character Recognition system or service 906 over at least one appropriate network 904, such as a cellular network, the Internet, or another such network for communicating digital information. The client device 902 can capture one or more images (or video) of text and send the images to the Optical Character Recognition system or service 906 over the at least one appropriate network 904. The Optical Character Recognition system 906 includes an image-processing module 908 that can apply different operators or techniques to pre-process the images before submitting the images to one or more optical character recognition modules 910. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 910 concurrently recognizes text from the image to produce multiple recognized text outputs. In at least one embodiment, a processor can analyze the recognized text using a database 912 of words in order to improve the recognition. The database 912 includes a set of words which the processor can search for matches corresponding to words present in the recognized text. At least a portion of these tasks can be performed on a portable computing device or by using at least one resource available across a network as well. In at least some embodiments, an OCR application will be installed on the client device 902, such that much of the processing, analyzing, or other such aspects can be executed on the client device. Various processing steps can be performed by the client device 902, by the Optical Character Recognition system 906, or a combination thereof. Therefore, it should be understood that the components and capabilities of the Optical Character Recognition system 906 could wholly or partly reside on the client device 902.

Figure 10:
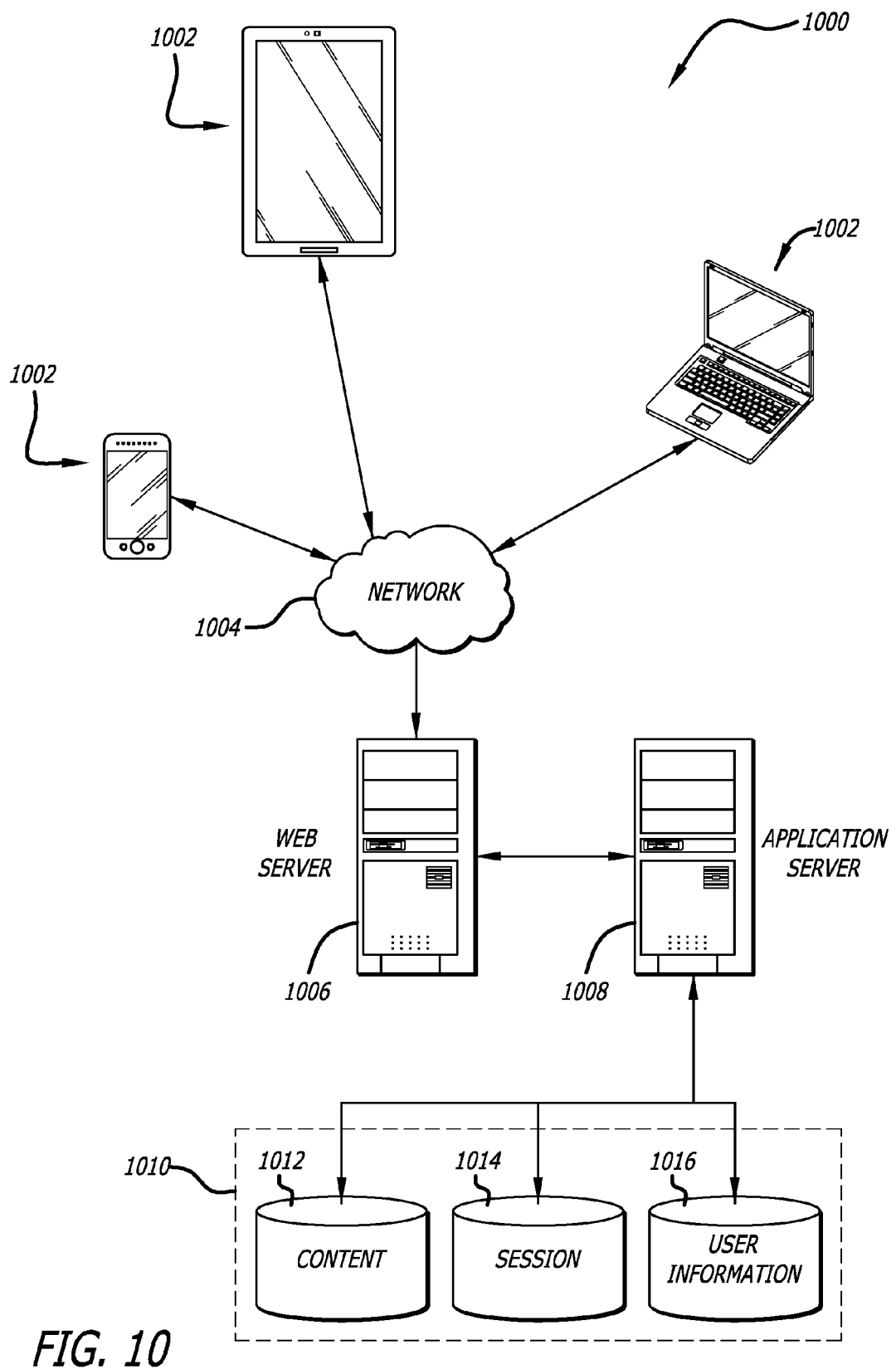
FIG. 10 illustrates another example environment in which various embodiments can be implemented.

FIG. 10 is an example environment 1000 in which a user can utilize a computing device to recognize text from multiple images, in accordance with various embodiments. It should be understood that the example system is a general overview of basic components, and that there can be many additional and/or alternative components utilized as known or used in the art for recognizing text in multiple images. In this example, a user is able to utilize a client device 1002, such as a personal computer, tablet computer, smart phone, and the like, to access an Optical Character Recognition system or service 1006 over at least one appropriate network 1004, such as a cellular network, the Internet, or another such network for communicating digital information. As described above, the client device 1002 can capture one or more images (or video) of text and send the images to the Optical Character Recognition system or service 1006 over the at least one appropriate network 1004. The Optical Character Recognition system 1006 includes an image-processing module 1008 that can apply different operators or techniques to pre-process the images before submitting the images to an optical character recognition module 1010. Examples of the operators include a Laplacian-or-Gaussian filter, thresholding filters, and so forth, which enhance or mitigate different characteristics of the images. Examples of these characteristics include intensity, blurriness, and so forth. After pre-processing, the optical character recognition module 1010 separately and independently recognizes text from within each image to produce multiple raw OCR outputs comprising a set of characters strings and location information of the characters in each image. In at least one embodiment, a processor can analyze and process the detected location information of the characters using a database 1012 of words in order to improve the recognition of the text in image. The database 1012 includes a set of words which the processor can search for matches corresponding to words present in the raw OCR output and location information for the set of words in order to recognize specific configurations of the characters. The processor can further compute the common substrings using the longest common substring (LCS) algorithm, compares each common substring to each text string to determine the alignment, and generates a template string. For the unresolved spaces or portions of the text between or adjacent the common substrings, the processor calculates a character frequency vote for each space to determine the character with highest occurrence. The final text string is then determined by filling the unresolved spaces with the character having the highest occurrence rate for a respective space. At least a portion of these tasks can be performed on a portable computing device or by using at least one resource available across a network as well. In at least some embodiments, an OCR application will be installed on the client device 1002, such that much of the processing, analyzing, or other such aspects can be executed on the client device. Various processing steps can be performed by the client device 1002, by the Optical Character Recognition system 1006, or a combination thereof. Therefore, it should be understood that the components and capabilities of the Optical Character Recognition system 1006 could wholly or partly reside on the client device 1002.

As discussed, different approaches can be implemented in various environments in accordance with the described embodiments. For example, FIG. 10 illustrates another example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under the control of one or more computer systems configured with executable instructions,
obtaining an image captured by a camera of a portable computing device;
identifying a first region and a second region within the image, the first region and the second region each containing at least one character of text;
determining that the first region has at least one of a first amount of blur, a first level of contrast, or a first amount of noise that falls outside an acceptable range;
determining that the second region has at least a second amount of blur, a second level of contrast, and a second amount of noise that falls within the acceptable range;
performing at least one local image enhancement on the first region to improve text recognition within the first region for an optical character recognition (OCR)

engine, wherein the at least one of the first amount of blur, the first level of contrast, and the first amount of noise is enhanced to fall within the acceptable range; and analyzing the first region with the OCR engine to attempt to recognize at least one text string in the image.

2. The computer-implemented method of claim 1, wherein the at least one local image enhancement includes image denoising, contrast stretching, histogram normalization, image sharpening, image upscaling, image deconvolution, or image super-resolution.

3. The computer-implemented method of claim 1, wherein the second region contains at least one character of text, and wherein the second region is analyzed by the OCR engine without the at least one local image enhancement being performed on the second region.

4. A computer-implemented method, comprising:
under the control of one or more computer systems configured with executable instructions,
obtaining an image captured with an imaging element of a computing device;
identifying, within the image, a first region and a second region, the first region and the second region each containing a representation of at least one object;
determining, by at least one processor, that the first region has a first image quality associated with poor object recognition, and that the second region has a second image quality associated with acceptable object recognition;
applying, by the at least one processor, at least one image quality enhancement to the first region to improve visual recognition within the first region, wherein the first image quality is improved to be associated with the acceptable object recognition; and
causing the first region to be processed using a visual recognition technique.

5. The computer-implemented method of claim 4, wherein the second region contains the representation of the at least one object, and wherein the second region is processed using the visual recognition technique without the at least one image quality lee-al enhancement being performed on the second region.

6. The computer-implemented method of claim 5, wherein identifying the first region includes prompting a user of the computing device to select the first region.

7. The computer-implemented method of claim 6, further comprising:
obtaining a second image;
identifying a second region in the second image based at least in part on previous selections of the user or other users on previous images; and
processing the second region with the visual recognition technique.

8. The computer-implemented method of claim 6, wherein the user selects the first region by at least one of tapping, touching, or hovering a finger above the first region of a display of the computing device.

9. The computer-implemented method of claim 4, wherein the at least one image quality enhancement includes image denoising, contrast stretching, histogram normalization, image sharpening, image upscaling, image deconvolution, or image super-resolution.

10. The computer-implemented method of claim 4, wherein the at least on quality associated with poor object recognition includes at least one of blur, poor contrast, a device movement effect, artifacts, or noise.

11. The computer-implemented method of claim 4, further comprising:
wherein the at least one object comprises text;
determining that a text size of the text is below a threshold size; and
upsampling the first region.

12. The computer-implemented method of claim 4, further comprising:
capturing image information of a user of the computing device;
from the captured image information, determining at least one gaze location of the user on a display screen of the computing device; and
based at least in part on the at least one gaze location, identifying the first region.

13. The computer-implemented method of claim 4, wherein the at least one object comprises at least one of text, a product, a face, a landmark, a business, a map, a barcode, or a quick response (QR) code.

14. A computing device, comprising:
a processor;
a display screen; and
memory including instructions that, when executed by the processor, cause the computing device to:
obtain an image captured with an imaging element of the computing device;
identify, within the image, a first region and a second region, the first region and the second region each containing text;
determine that the first region has a first text quality associated with poor text recognition, and that the second region has a second text quality associated with acceptable text recognition;
apply at least one image quality enhancement to the first region to improve text recognition within the first region, wherein the first text quality is improved to be associated with the acceptable text recognition; and
causing the first region to be processed using a visual recognition technique.

15. The computing device of claim 14, wherein the second region contains at least one second object, and wherein the second region is processed using the visual recognition technique without the at least one image quality enhancement being performed on the second region.

16. The computing device of claim 15, wherein identifying the first region includes prompting a user of the computing device to select the first region.

17. The computing device of claim 16, wherein the instructions, when executed by the processor, further enable the computing device to:
obtain a second image;
identify a second region in the second image based at least in part on previous selections by the at least one of the user or multiple other user on previous images; and
process the at least one second region with the visual recognition technique.

18. The computing device of claim 15, wherein a user selects the first region by at least one of tapping, touching, or hovering a finger above the first region of the display screen.

19. The computing device of claim 14, wherein the at least one image quality enhancement includes image denoising, contrast stretching, histogram normalization, image sharpening, image upscaling, image deconvolution, or image super-resolution.

20. The computing device of claim 14, wherein the at least on quality associated with poor object recognition includes at least one of blur, poor contrast, a device movement effect, artifacts, or noise.

21. A non-transitory computer-readable storage medium storing instructions that, when executed by at least one processor, cause a computing device to:
- obtain an image captured with an imaging element of a computing device;
- identify, within the image, a first region and a second region, the first region and the second region each containing text;
- determine that the first region has a first quality associated with poor text recognition, and that the second region has a second quality associated with acceptable text recognition;
- apply at least one image quality enhancement to the first region to improve text recognition within the first region, wherein the first quality is improved to be associated with the acceptable text recognition; and
- causing the first region to be processed using a visual recognition technique.

22. The non-transitory computer-readable storage medium of claim 21, wherein the instructions that, when executed by the at least one processor, further cause the computing device to:
- determining that a text size is below a threshold size; and
- upsample the first region.

23. The non-transitory computer-readable storage medium of claim 21, wherein the at least one image quality enhancement includes image denoising, contrast stretching, histogram normalization, image sharpening, image upscaling, image deconvolution, or image super-resolution.

24. The non-transitory computer-readable storage medium of claim 21, wherein quality associated with poor text recognition includes at least one of blur, poor contrast, a device movement effect, artifacts, or noise.

25. The non-transitory computer-readable storage medium of claim 21, wherein the visual recognition technique is an optical character recognition engine.

* * * * *